US010442000B2

(12) United States Patent
Fukada et al.

(10) Patent No.: US 10,442,000 B2
(45) Date of Patent: Oct. 15, 2019

(54) TITANIUM-BASED POWDER, AND INGOT AND SINTERED ARTICLE THEREOF

(71) Applicant: TOHO TITANIUM CO., LTD., Kanagawa (JP)

(72) Inventors: Nobuo Fukada, Kanagawa (JP); Osamu Kanou, Kanagawa (JP); Shigehisa Takenaka, Kanagawa (JP)

(73) Assignee: TOHO TITANIUM CO., LTD., Kanagawa (JP)

( * ) Notice: Subject to any disclaimer, the term of this patent is extended or adjusted under 35 U.S.C. 154(b) by 126 days.

(21) Appl. No.: 15/552,540

(22) PCT Filed: Feb. 17, 2016

(86) PCT No.: PCT/JP2016/054556
§ 371 (c)(1),
(2) Date: Aug. 22, 2017

(87) PCT Pub. No.: WO2016/140064
PCT Pub. Date: Sep. 9, 2016

(65) Prior Publication Data
US 2018/0021854 A1 Jan. 25, 2018

(30) Foreign Application Priority Data
Mar. 5, 2015 (JP) ................................. 2015-043908

(51) Int. Cl.
| B22F 1/00 | (2006.01) |
| B22F 9/10 | (2006.01) |
| B33Y 70/00 | (2015.01) |
| B22F 9/04 | (2006.01) |
| B22F 9/08 | (2006.01) |
| B22F 3/105 | (2006.01) |
| C22C 1/04 | (2006.01) |

(52) U.S. Cl.
CPC .............. *B22F 1/0048* (2013.01); *B22F 9/10* (2013.01); *B33Y 70/00* (2014.12); *B22F 3/1055* (2013.01); *B22F 9/04* (2013.01); *B22F 9/08* (2013.01); *B22F 9/082* (2013.01); *C22C 1/0458* (2013.01); *Y02P 10/295* (2015.11)

(58) Field of Classification Search
None
See application file for complete search history.

(56) References Cited

U.S. PATENT DOCUMENTS

| 2,969,281 A * | 1/1961 | Monson ................ B22F 1/0048 75/342 |
| 4,783,216 A * | 11/1988 | Kemp, Jr. .............. B22F 1/0048 219/121.38 |
| 6,168,644 B1 * | 1/2001 | Fukasawa ............... B22F 9/023 423/645 |
| 2011/0129682 A1 | 6/2011 | Kurata et al. |
| 2014/0334964 A1 * | 11/2014 | Kanou ..................... B22F 3/20 419/48 |
| 2016/0175929 A1 | 6/2016 | Colin et al. |
| 2017/0189960 A1 | 7/2017 | Ibe |

FOREIGN PATENT DOCUMENTS

| JP | 2005-254534 A | 9/2005 |
| JP | 2006-321711 A | 11/2006 |
| JP | 2009-040870 A | 2/2009 |
| JP | 2011-052289 A | 3/2011 |
| WO | 2015/001241 A2 | 1/2015 |
| WO | 2015/194678 A1 | 12/2015 |

OTHER PUBLICATIONS

Guosheng Gai et al. "Particle shape modification and related property improvements" (2008) Powder Technology, 183, 115-121 (Year: 2008).*
International Search Report issued in PCT/JP2016/054556; dated May 10, 2016.
Kirihara; "Production of metal and ceramic structure using nano-particulate slurry stereolithography"; Abstracts of Autumn Meeting of the Japanese Society of Powder and Powder Metallurgy; 2013; p. 105.
Adachi et al.; "Characteristics of 3D-metal lamination molding method using electron beam and possibility of the same"; Abstracts of Autumn Meeting of the Japanese Society of Powder and Powder Metallurgy; 2013; p. 104.
Notification of Transmittal of Translation of the International Preliminary Report on Patentability (Chapter I) and Translation of Written Opinion of the International Searching Authority; PCT/JP2016/054556; dated Sep. 14, 2017.
An Office Action; "Notice of Reasons for Refusal," issued by the Japanese Patent Office dated Sep. 10, 2018, which corresponds to Japanese Patent Application No. 2017-503406 and is related to U.S. Appl. No. 15/552,540; with English translation.
Extended European Search Report issued by the European Patent Office dated Sep. 24, 2018, which corresponds to EP16758758.3-1103 and is related to U.S. Appl. No. 15/552,540.
Sun, Y. Y. et al., "Manipulation and Characterization of a Novel Titanium Powder Precursor for Additive Manufacturing Applications", JOM: Journal of Metals, Feb. 4, 2015, pp. 564-572, vol. 67, No. 3, Springer New York LLC, United States.
An Office Action mailed by the Canadian Patent Office dated Nov. 26, 2018, which corresponds to Canadian Patent Application No. 2,976,065 and is related to U.S. Appl. No. 15/552,540.

(Continued)

*Primary Examiner* — Seth Dumbris
*Assistant Examiner* — Kim S. Horger
(74) *Attorney, Agent, or Firm* — Studebaker & Brackett PC

(57) ABSTRACT

Provided are a titanium-based powder excellent in fluidity and shape retention property, and an ingot and a sintered article obtained using the titanium-based powder as a material. The titanium-based powder has an average circularity of 0.815 or more and less than 0.870, a CV value of particle sizes of 22 or more and 30 or less, and an angle of repose of 29 degrees or more and 36 degrees or less.

8 Claims, No Drawings

(56) References Cited

OTHER PUBLICATIONS

An Office Action mailed by the Korean Intellectual Property Office dated Mar. 19, 2019, which corresponds to Korean Patent Application No. 10-2017-7027795 and is related to U.S. Appl. No. 15/552,540.

* cited by examiner

TITANIUM-BASED POWDER, AND INGOT AND SINTERED ARTICLE THEREOF

TECHNICAL FIELD

The present invention relates to titanium-based powders suitable as a material powder for powder metallurgy, more particularly to a titanium-based powder excellent in fluidity and shape retention property, and to an ingot and a sintered article obtained using the same as a material.

BACKGROUND ART

Owing to the excellent properties, such as corrosion resistance, ductility, and strength, titanium and titanium alloys are widely used as a material of aircrafts, golf clubs, and the like. In addition, due to the affinity to a living body, the materials are actively applied to a medical application, such as a dentistry application and an orthopedic application.

As described above, since titanium and titanium alloys have a wide variety of applications, a wide variety of processing techniques, such as, for example, cutting work and pressing work, are utilized for processing the materials. Particularly in recent years, as a processing technique for medical applications, methods for producing products and parts having different shapes and specifications on demand have increasingly been required.

As a technique for reproducing a desired shape on demand, a method in which a material is deposited to thereby form a three-dimensional shape (additive manufacturing technique) attracts attentions today, and 3D-printers which are three-dimensional printing processing apparatuses mainly using a polymer as a material are becoming popular.

As a material used for processing by a 3D-printer, aside from polymers, yttria-stabilized zirconia, pure copper, and hydroxyapatite are known (NPL 1). In addition, use of Ti-6Al-4V (64 titanium) as a material to be fed to a 3D-printer is also attempted (NPL 2).

However, NPL 1 does not disclose a processing technique using a titanium or titanium alloy powder as a material.

On the other hand, NPL 2 discloses a 3D metal lamination molding method using a Ti-6A1-4V alloy powder as a material, but only the average particle size is disclosed with respect to the shape and characteristics of the powder. NPL 2 focuses on the comparison between a metal powder laminated article produced by the 3D metal lamination molding method and a molded article produce by other methods (annealed article, rolled article), and there is disclosed no technical idea to reproduce an intended shape more precisely by controlling the shape and characteristics of the material alloy powder.

In addition, in light of experience of the inventors, when a general titanium or titanium alloy powder is used as a material to be fed to a 3D-printer, the shape collapses while a thin layer of the powder is-melt melted in a predetermined section, and a part or product having a desired shape can not be produced with high reproducibility in some cases. An improvement is demanded in this point.

CITATION LIST

Non Patent Literature

NPL 1: KIRIHARA Akihide, Production of metal and ceramic structure using nano-particulate slurry stereolithography)", Abstracts of Autumn Meeting of the Japanese Society of Powder and Powder Metallurgy, 2013, p. 105

NPL 2: ADACHI Mitsuru et al., "Characteristics of 3D-metal lamination molding method using electron beam and possibility of the same)", Abstracts of Autumn Meeting of the Japanese Society of Powder and Powder Metallurgy, 2013, p. 104

SUMMARY OF INVENTION

Technical Problem

The present invention is made in view of the above situation, and problems that the present invention is to solve are to provide a titanium-based powder that is excellent in fluidity and shape retention property, and to provide an ingot and a sintered article obtained by melting or sintering the titanium-based powder.

Solution to Problem

As a result of intensive studies to solve the above problems, the present inventors have found that the problem can be effectively solved by controlling an average circularity, a CV value of particle sizes, and an angle of repose into specific ranges, thereby completing the present invention.

The present invention has been made based on the above finding, and is described as follows.

[1] A titanium-based powder, which has an average circularity of 0.815 or more and less than 0.870, a CV value of particle sizes of 22 or more and 30 or less, and an angle of repose of 29 degrees or more and 36 degrees or less.

[2] The titanium-based powder according to the above [1], which is a titanium-based powder containing a spherical titanium-based powder and a non-spherical titanium-based powder.

[3] The titanium-based powder according to the above [1] or [2], which contains spherical titanium-based particles in a number ratio of 35% to 80% and contains non-spherical titanium-based particles in a number ratio of 20% to 65%.

[4] The titanium-based powder according to the above [2] or [3], which is a titanium-based powder obtained by mixing a spherical titanium-based powder and a non-spherical titanium-based powder.

[5] The titanium-based powder according to the above [4], wherein the spherical titanium-based powder is a titanium-based powder produced by an atomization method, a titanium-based powder produced by a P-REP method, a titanium-based powder obtained by subjecting a titanium-based powder produced by an HDH method to a plasma processing, a titanium-based powder obtained by subjecting a titanium-based powder produced by an pulverization method to a plasma processing, or a titanium-based powder obtained by mixing two or more thereof.

[6] The titanium-based powder according to the above [4], wherein the non-spherical titanium-based powder is a titanium-based powder produced by an HDH method, a titanium-based powder produced by a pulverization method, or a titanium-based powder obtained by mixing the foregoing powders.

[7] An ingot, which is obtained by melting a powder containing the titanium-based powder as set forth in any one of the above [1] to [6].

[8] A sintered article, which is obtained by sintering a powder containing the titanium-based powder as set forth in any one of the above [1] to [6].

Advantageous Effects of Invention

The present invention has a highly notable effect of maintaining the good fluidity and shape retention property of a titanium-based powder by controlling an average circularity, a CV value of particle sizes, and an angle of repose of the titanium-based powder into specific ranges. Accordingly, by using the titanium-based powder of the present invention, an ingot or a sintered article in which an intended shape is precisely reproduced can be obtained without clogging of a feeder of the titanium-based powder or other feeding failure and surface smoothening failure of the fed powder.

DESCRIPTION OF EMBODIMENT

The titanium-based powder of the present invention has an average circularity of 0.815 or more and less than 0.870. The average circularity is preferably 0.815 or more and 0.867 and less, and more preferably 0.817 or more and 0.867 or less.

The average circularity refers to a value obtained by measuring the circularities of approximately 1000 to 1500 particles by an image analysis of a photomicrograph and calculating the average thereof. As used herein, the circularity is defined as B/A in which A represents a peripheral length of a projected area of a particle as measured with an electron microscope or an atomic microscope and B represents a peripheral length of a circle having an area equal to the projected area.

The average circularity of the titanium-based powder can be determined, for example, as follows. The titanium-based powder is allowed to flow in a cell together with a carrier liquid, capturing an image of a large number of particles with a CCD camera; measuring, from each particle image of 1000 to 1500 particles, a peripheral length (A) of a projected area of each particle and a peripheral length (B) of a circle having an area equal to the projected area to calculate the circularity; and calculating the average of the circularities of the particles.

The numerical value of the circularity increases as the shape of the particle comes close to a true sphere, and the circularity of a particle with a complete spherical shape is 1. Conversely, the numerical value of the circularity decreases as the particle shape deviates from a true sphere.

A titanium-based powder having an average circularity less than 0.815 is not preferred since it is poor in the fluidity. Such a titanium-based powder having a small average circularity contains many particles that have many irregularities on the particle surface and therefore has large dynamic friction, resulting in impairing the fluidity. A titanium-based powder having poor fluidity possibly causes, for example, clogging of a material feeding member in an apparatus for producing an ingot or a sintered article using the titanium-based powder as a material.

On the other hand, a titanium-based powder having an average circularity of 0.870 or more is not preferred since it is poor in the shape retention property. An ingot or a sintered article in which an intended shape is reproduced can not be obtained from a titanium-based powder poor in the shape retention property.

The titanium-based powder of the present invention has a CV value of particle sizes of 22 or more and 30 or less. The CV value of particle sizes is preferably 24 or more and 30 or less, and more preferably 26 or more and 30 or less.

The CV value (coefficient of variation) of particle sizes refers to a value defined by the following equation.

$$\text{CV value of particle sizes} = (\text{standard deviation of particle sizes}/\text{average particle size}) \times 100$$

The average particle size can be measured by an image analysis of a photomicrograph and the like. Specifically, particle sizes of approximately 1000 to 1500 particles are measured and the average thereof is calculated.

The standard deviation of particle sizes is the standard deviation of the measures particle sizes, and the CV value of particle sizes is the coefficient of variation of the particle sizes. The CV value of particle sizes is a measure representing how large the variation of the particle sizes is. That is, the lower the CV value of particle sizes is, the smaller the variation of the particle sizes, whereas the larger the CV value of particle sizes is, the larger the variation of the particle sizes.

A titanium-based powder having a CV value of particle sizes less than 22 is not preferred since it is poor in the shape retention property. Such a titanium-based powder having a small CV value of particle sizes has a very small variation in the particle sizes, and there are a small number of particles having a different size that fill in the void spaces between the particles of the titanium-based powder. For this reason, when the titanium-based powder is melt or sintered, the molten titanium-based powder fill in the void spaces, and as a result, an ingot or a sintered article in which an intended shape is reproduced can not be obtained.

On the other hand, a titanium-based powder having a CV value of particle sizes larger than 30 is not preferred since it is poor in the fluidity. A titanium-based powder poor in the fluidity possibly causes, for example, clogging of a feeding member of the titanium-based powder in an apparatus for producing an ingot or a sintered article.

The titanium-based powder of the present invention has an angle of repose of 29 degrees or more and 36 degrees or less.

The angle of repose is a value obtained by a method in accordance with JIS R9301-2-2.

A titanium-based powder having an angle of repose less than 29 degrees is not preferred since it is poor in the shape retention property. It is considered that such a titanium-based powder having small angle of repose shows small friction between the particles, and therefore, when the particles are pulled due to solidification and contraction of the titanium-based powder molten in melting or sintering, the particles are easy to move and can not maintain the shape. An ingot or a sintered article in which an intended shape is reproduced can not be obtained from a titanium-based powder poor in the shape retention property.

On the other hand, a titanium-based powder having an angle of repose larger than 36 degrees is not preferred since it is poor in the fluidity. A titanium-based powder poor in the fluidity possibly causes, for example, clogging of a feeding member of the titanium-based powder in an apparatus for producing an ingot or a sintered article.

The titanium-based powder of the present invention preferably has an apparent density of 1.80 $g/cm^3$ or more and more preferably 1.85 $g/cm^3$ or more, and preferably 2.70/$cm^3$ or less and more preferably 2.65 $g/cm^3$ or less.

A titanium-based powder having an apparent density in the above range is preferred since it can achieve both of the appropriate powder feed fluidity and the resistant to collapse during lamination melting.

The apparent density is also referred to as bulk density, and can be measured according to JIS 22504.

The titanium-based powder of the present invention has a tap density of preferably 2.20 $g/cm^3$ or more and more preferably 2.22 g/cm³ or more, and preferably 2.90 g/cm³ or less and more preferably 2.85 g/cm³ or less.

A titanium-based powder having a tap density in the above range is preferred since it leads to a small void space during feeding and packing the powder and a small remaining void space after lamination melting and solidification.

The tap density can be measured according to JIS 22512.

The titanium-based powder of the present invention is a pure titanium powder or a titanium alloy powder. The pure titanium powder is a titanium powder composed of the metal titanium and other inevitable impurities. Examples of the titanium alloy powder include Ti-6-4 (Ti-6Al-4V), Ti-5Al-2.5Sn, Ti-8-1-1 (Ti-8Al-1Mo-1V), Ti-6-2-4-2 (Ti-6Al-2Sn-4Zr-2Mo-0.1Si), Ti-6-6-2 (Ti-6Al-6V-2Sn-0.7Fe-0.7Cu), Ti-6-2-4-6 (Ti-6Al-2Sn-4Zr-6Mo), SP700 (Ti-4.5Al-3V-2Fe-2Mo), Ti-17 (Ti-5Al-2Sn-2Zr-4Mo-4Cr), β-CEZ (Ti-5Al-2Sn-4Zr-4Mo-2Cr-1Fe), TIMETAL555, Ti-5553 (Ti-5Al-5Mo-5V-3Cr-0.5Fe), TIMETAL21S (Ti-15Mo-2.7Nb-3Al-0.2Si), TIMETAL LCB (Ti-4.5Fe-6.8Mo-1.5Al), 10-2-3 (Ti-10V-2Fe-3Al), Beta C (Ti-3Al-8V-6Cr-4Mo-4Cr), Ti-8823 (Ti-8Mo-8V-2Fe-3Al), 15-3 (Ti-15V-3Cr-3Al-3Sn), Beta III (Ti-11.5Mo-6Zr-4.5Sn), and Ti-13V-11Cr-3Al.

The shape retention property, as used in the present invention, means a characteristic that a titanium-based powder or a powder containing the titanium-based powder fed when producing an ingot or a sintered article maintains a prescribed shape without collapsing during melting or sintering.

The fluidity in the present invention is, as described later, defined as a time required for discharging a titanium-based powder accumulated in a prescribed amount in a prescribed container downward through an opening having a prescribed size.

The titanium-based powder of the present invention may be a titanium-based powder containing a spherical titanium-based powder and a non-spherical titanium-based powder.

In the titanium-based powder of the present invention, a titanium-based powder having an average circularity, a CV value of particle sizes, and an angle of repose in the ranges of the present invention can be obtained by classifying only a spherical titanium-based powder or only a non-spherical titanium-based powder. However, such a titanium-based powder can easily be produced by mixing a spherical titanium-based powder and a non-spherical titanium-based powder. By mixing a spherical titanium-based powder and a non-spherical titanium-based powder, in particular, the average circularity can be regulated easily.

The spherical titanium-based powder means a titanium-based powder that includes primary particles having a true sphere or true sphere-like shape and has an average circularity of the primary particles of 0.85 to 1.0. The primary particle having a true sphere or true sphere-like shape does not necessarily have a complete true sphere shape and can deviate from a true sphere in some degree.

Here, the primary particle refers to a particle that is considered as a unit particle, judging by the apparent geometric form. In the case of a particle in a form in which plural particles are linked by point contact, the whole of the linked particles is handled as a primary particle.

The non-spherical titanium-based powder means a titanium-based powder that includes primary particles not having a true sphere or true sphere-like shape and has an average circularity of the primary particles of 0.50 or more and less than 0.85.

Incidentally, a titanium-based powder having an average circularity less than 0.50 is not used since it is not suitable for the purpose of the present invention.

As the titanium-based powder, a titanium-based powder that contains spherical titanium-based particles in a number ratio of 35% to 80% and contains non-spherical titanium-based particles in a number ratio of 20% to 65% is preferred. A titanium-based powder that contains spherical titanium-based particles in a number ratio of 35% to 75% and contains non-spherical titanium-based particles in a number ratio of 25% to 65% is more preferred. When the mixing ratio of the spherical titanium particles and non-spherical titanium-based particles is in the above range, the average circularity, CV value of particle sizes, and angle of repose of the titanium-based powder can be easily regulated.

Here, the spherical titanium-based particles refer to particles of a pure titanium powder or titanium alloy powder which have a circularity of the primary particles of 0.85 to 1.0. The non-spherical titanium-based particles refer to particles of a pure titanium powder or titanium alloy powder which have a circularity of the primary particles of 0.50 or more and less than 0.85.

The number ratio can be determined, for example, as follows. The titanium-based powder is allowed to flow in a cell together with a carrier liquid, an image of a large number of particles is captured by a CCD, from each particle image of 1000 to 1500 particles, the circularity of each particle is calculated to distinguish the spherical titanium-based particles and the non-spherical titanium-based particles, and the ratio of the numbers of the spherical titanium-based particles and the non-spherical titanium-based particles distinguished is calculated.

Examples of the spherical titanium-based powder for use in the titanium-based powder of the present invention include a titanium-based powder produced by a gas atomization method, a titanium-based powder produced by a P-REP method, a titanium-based powder obtained by processing a titanium-based powder produced by an HDH method with plasma into a spherical shape, a titanium-based powder obtained by processing a titanium-based powder produced by a pulverization method with plasma into a spherical shape, and a titanium-based powder obtained by mixing two or more thereof. The use of a titanium-based powder produced by a gas atomization method and a titanium-based powder obtained by processing a titanium-based powder produced by an HDH method with plasma into a spherical shape is particularly preferred.

An atomization method is a powder production method in which a material such as titanium is molten, a fluid such as an inert gas is blown on the molten metal to pulverize the molten metal into liquid droplets, which are then solidified into powder. Specific examples include a gas atomization method and a reactive laser atomization method.

A P-REP method is a powder production method which is also called a plasma rotating electrode method, and is a method in which while rotating an electrode formed with a material to be molten such as titanium at high speed, the electrode is molten by plasma arc and formed into powder by means of centrifugal force.

An HDH method is a powder production method which is also called a hydrodehydrogenation method and a method of powder formation utilizing a property of metal titanium and the like occluding hydrogen to embrittle.

A spherical titanium-based powder obtained by the production method generally has an average particle size of approximately from 10 to 90 μm in the case of a titanium-based powder produced by a gas atomization method, approximately from 50 to 160 μm in the case of a titanium-based powder produced by a reactive laser atomization method, approximately from 20 to 100 μm in the case of a titanium-based powder obtained by processing a titanium-based powder produced by an HDH method with plasma into a spherical shape, approximately from 20 to 100 μm in the case of a titanium-based powder obtained by processing a titanium-based powder produced by a pulverization method with plasma into a spherical shape, and approximately from 20 to 100 μm in the case of a titanium-based powder produced by a P-REP method. A preferred average particle size of the spherical titanium-based powder used in the present invention is 20 to 100 μm.

Incidentally, by subjecting the spherical titanium-based powder to classification or the like, the average circularity, the CV value of particle sizes, and the angle of repose can be regulated into the ranges of the present invention. In the classification process, the powder is classified by a known method. For example, classification with a sieve and airflow classification is exemplified.

Example of the non-spherical titanium-based powder for use in the titanium-based powder of the present invention include a titanium-based powder produced by an HDH method, a titanium-based powder produced by a pulverization method, and a titanium-based powder obtained by mixing the above powders. The shape of the titanium-based powder obtained by these production methods is irregular and non-spherical.

The non-spherical titanium-based powder obtained by the above production methods generally has an average particle size of approximately from 15 to 100 μm in the case of a titanium-based powder which is produced by an HDH method and then classified by a known method, and approximately from 20 to 150 μm in the case of a titanium-based powder produced by a pulverization method. The non-spherical titanium-based powder more preferably has an average particle size of 20 to 100 μm.

Incidentally, by classifying the non-spherical titanium-based powder, the average circularity, the CV value of particle sizes, and the angle of repose can be regulated into the ranges of the present invention. In the classification process, the powder is classified by a known method. For example, classification with a sieve and airflow classification is exemplified.

The production method of the titanium-based powder of the present invention obtained by mixing a spherical titanium-based powder and a non-spherical titanium-based powder is not particularly limited, but for example, the titanium-based powder can be produced by the following method.

First, for each of a spherical titanium-based powder and a non-spherical titanium-based powder used as materials, the average circularity, the standard deviation of particle sizes, the average particle size, and the angle of repose are measured. Based on the measurement results, a guide value of the mixing ratio is determined so as to achieve the average circularity, the CV value of particle sizes, and the angle of repose in the ranges of the present invention after mixing the spherical titanium-based powder and the non-spherical titanium-based powder. Based on the guide value, the spherical titanium-based powder and the non-spherical titanium-based powder are mixed, and then the average circularity, the CV value of particle sizes, and the angle of repose are obtained.

When the average circularity, the CV value of particle sizes, and the angle of repose do not fall within the ranges of the present invention, the titanium-based powder after mixing is classified and regulated so that the average circularity, the CV value of particle sizes, and the angle of repose fall within the ranges of the present invention.

As a general trend, a smaller particle size of the titanium-based powder gives a smaller circularity. Conversely, a larger particle size of the titanium-based powder gives a larger circularity.

Also as a general trend, a larger average circularity leads to a smaller angle of repose. Conversely, a smaller average circularity leads to a larger angle of repose.

For example, when an angle of repose of a titanium-based powder after mixing a spherical titanium-based powder and a non-spherical titanium-based powder is larger than the range of the present invention, by classifying the powder to remove the fine powder side, the angle of repose can be decreased. When an angle of repose of a titanium-based powder after mixing a spherical titanium-based powder and a non-spherical titanium-based powder is smaller than the range of the present invention, by classifying the powder to remove the coarse powder side, the angle of repose can be increased.

In mixing of the titanium-based powder, a known method may be used. For example, a mixer such as a vessel rotating-type mixer (horizontal cylinder, inclined cylinder, V-shaped type, etc.) and a mechanical stirring-type mixer (ribbon, screw, rod, etc.) may be used.

In addition, the average particle size and the particle size distribution may be regulated by subjecting a regulated material to a further classification process. The classification method is the same as the above.

The titanium-based powder of the present invention can be used in an ingot which is produced by heating an aggregate of the titanium-based powder of the present invention to a temperature of the melting point or higher, or in a sintered article which is produced by heating the aggregate of the titanium-based powder of the present invention to a temperature of the melting point or lower to sinter the powder. Specific examples of the method of heating the powder to a temperature of the melting point or higher include a laser melting method, a fused deposition modeling (FDM) process, a powder bed fusion process, and an electron beam melting process. Specific examples of the method of heating the powder to a temperature of the melting point or lower for sintering include a selective laser sintering process (SLS process), a laser powder sintering process, a spark plasma sintering process (SPS process), a hot extrusion process, and a hot pressing process.

More specifically, the titanium-based powder with respect to the present invention can be suitably used as a material powder for powder metallurgy, and among others, as a material powder for additive manufacturing apparatus, particularly as a material powder for a 3D-printer.

As described above, according to the present invention, a titanium-based powder excellent in fluidity and shape retention property and an ingot or a sintered article obtained by melting or sintering the powder can be provided.

EXAMPLES

Hereinunder, the gist of the present invention will be described more specifically with reference to Examples and Comparative Examples, but the invention is not to be limited by the examples.

Material powders for titanium-based powders used in the Examples and equipment for processing the same is shown below.

1. Non-spherical titanium-based powder: a titanium alloy powder obtained by subjecting a powder produced by an HDH method to a known classification process
   1) titanium 64 alloy
   2) produced by an HDH method
   3) average particle size: 81 μm
   4) average circularity: 0.81

2. Non-spherical titanium-based powder: a titanium alloy powder obtained by subjecting a powder produced by an HDH method to a known classification process
   1) titanium 64 alloy
   2) produced by an HDH method
   3) average particle size: 58 μm
   4) average circularity: 0.81
3. Spherical titanium-based powder: a titanium alloy powder obtained by processing a titanium alloy powder produced by an HDH method with plasma into a spherical shape
   1) a spherical powder produced by processing a titanium-based powder produced by an HDH method with a plasma into a spherical shape and subjecting the resultant to a known classification process (performing a melt spheroidizing treatment with a high frequency induction heat plasma treatment device held by Daiken Chemical Co., LTD)
   2) average particle size: 73 μm
   3) average circularity: 0.89
4. Spherical titanium-based powder: a titanium alloy powder obtained by processing a titanium alloy powder produced by an HDH method with plasma into a spherical shape
   1) a spherical powder produced by processing a titanium-based powder produced by an HDH method with plasma into a spherical shape, and subjecting the resultant to a known classification process (performing melt spheroidizing treatment with a high frequency induction heat plasma treatment device held by Daiken Chemical Co., LTD)
   2) average particle size: 65 μm
   3) average circularity: 0.85

Measurement methods of the average circularity, the average particle size, the number ratio of spherical titanium-based particles and non-spherical titanium-based particles in a mixed powder, the angle of repose, the fluidity, the shape retention property, the apparent density, and the tap density are shown below.

(1) Measurement of Average Circularity

Measurement was performed using PITA 3 manufactured by Seishin Enterprise Co., Ltd. Specifically, particles were allowed to flow in a cell together with a carrier liquid, an image of a large number of particles were captured by a CCD camera, and from an image of each particle, a peripheral length (A) of a projected area of the particle and a peripheral length (B) of a circle having an area equal to the projected area were measured to calculate B/A of the peripheral length (A) of the projected area and the peripheral length (B) of a circle having an equal area with the projected area as the circularity. For 1000 to 1500 particles, the circularities were measured, and the number average value thereof was taken as the average circularity.

(2) Measurement of Average Particle Size and CV Value of Particle Sizes

From the image of each particle from the PITA 3 manufactured by Seishin Enterprise Co., Ltd., a projected area of the particle was measured, and the diameter of a circle having an area equal to the projected area of the particle was taken as the particle size of the particle. For 1000 to 1500 particles, the particle sizes were measured and the number average value thereof was taken as the average particle size.

The standard deviation of the number distribution of the particle sizes was determined and the CV value (coefficient of variation) of particle sizes was calculated with the following equation.

CV value of particle sizes=(standard deviation of particle sizes/average particle size)×100

(3) Measurement of Number Ratio of Spherical Titanium-Based Particles and Non-Spherical Titanium-Based Particles in Mixed Powder From an image of each particle from the PITA 3 manufactured by Seishin Enterprise Co., Ltd., the circularity of the particle was calculated to distinguish the spherical titanium-based particles and the non-spherical titanium-based particles, and the respective numbers of the distinguished spherical titanium-based particles and non-spherical titanium-based particles were obtained and the ratio thereof was taken as the number ratio.

(4) Measurement of Angle of Repose

The angle of repose was evaluated according to JIS R9301-2-2. Specifically, using a powder tester PT-S (Registered Trademark) manufactured by Hosokawa Micron Group, a measurement sample was put through a funnel attached to the powder tester. The sample was fed until a sufficient mountain was formed on a tray, and the angle of the formed mountain was measured.

(5) Measurement of Fluidity

The fluidities of mixed powders having different mixing ratios were evaluated based on JIS 22502: 2012 titanium-based powder fluidity measurement method. A sample of 50 g was placed in a funnel having a caliber of 2.63 mm, and the time (seconds) until the entire sample fell was taken as the fluidity (s/50 g). A smaller value means a higher fluidity. "Unmeasurable" means the case where the funnel was clogged and the powder did not flow down.

(6) Evaluation of Shape Retention Property

Mixed powders having different mixing ratios were each placed in a sheet form on a water-cooled copper plate and irradiated with laser at one site. Behavior of particles of the titanium powder at and around the irradiated site was investigated and a 3D-printing process was performed. The case where a prescribed shape did not collapse upon melting the metal was evaluated as "good" and designated as "○", and the case where the shape collapsed on the way was evaluated as "no-good" and designated as "×".

(7) Measurement of Apparent Density and Tap Density

The apparent densities of mixed powders having different mixing ratios were evaluated according to JIS 22504 and the tap densities thereof were evaluated according to JIS 22512.

Examples 1 to 5, Comparative Examples 1 to 3

(Production of Mixed Powder)

The non-spherical titanium-based powder and the spherical titanium-based powder of the above 1 and 3 were weighed so as to achieve each target mixing ratio shown in Table 1 and give a total weight of 5 kg, and the powders were put in a V-shaped mixer (V-10 type manufactured by Tokuju Corporation), mixed for 10 minutes and then collected.

The average circularity, the average particle size, the fluidity, the shape retention property, the apparent density, the tap density, and the angle of repose of each obtained mixed powder were measured. The measurement results are shown in Table 1.

Examples 6 to 10, Comparative Examples 4 to 6

Production of Mixed Powder

The non-spherical titanium-based powder and the spherical titanium-based powder of the above 2 and 4 were weighed so as to achieve each target mixing ratio shown in Table 2 and give a total weight of 5 kg, and the powders were put in a V-shaped mixer (V-10 type manufactured by Tokuju Corporation), mixed for 10 minutes and then collected.

The average circularity, the average particle size, the fluidity, the shape retention property, the apparent density, the tap density, and the angle of repose of each obtained mixed powder were measured. The measurement results are shown in Table 2.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Ratio of spherical titanium-based powder (mass %) | 20 | 30 | 40 | 50 | 60 | 0 | 100 | 70 |
| Ratio of non-spherical titanium-based powder (mass %) | 80 | 70 | 60 | 50 | 40 | 100 | 0 | 30 |
| Number ratio of spherical titanium-base particles (%) | 38 | 43 | 60 | 70 | 72 | 29 | 84 | 75 |
| Number ratio of non-spherical titanium-base particles (%) | 62 | 57 | 40 | 30 | 28 | 71 | 16 | 25 |
| Average circularity of mixed powder | 0.817 | 0.820 | 0.847 | 0.862 | 0.866 | 0.810 | 0.890 | 0.870 |
| CV value of particle sizes of mixed powder | 29 | 28 | 27 | 28 | 29 | 30 | 29 | 31 |
| Angle of repose (degrees) | 35 | 35 | 35 | 33 | 30 | 36 | 23 | 28 |
| Fluidity (s/50 g) | 47.0 | 42.0 | 37.7 | 35.8 | 34.7 | Unmeasurable | 28.5 | 33.5 |
| Shape retention property | ○ | ○ | ○ | ○ | ○ | Implementation failure | x | x |
| Apparent density (bulk density) (g/cm$^3$) | 1.90 | 2.04 | 2.10 | 2.18 | 2.29 | 1.76 | 2.67 | 2.39 |
| Tap density (g/cm$^3$) | 2.29 | 2.40 | 2.46 | 2.58 | 2.63 | 2.17 | 2.86 | 2.67 |

TABLE 2

|  | Example 6 | Example 7 | Example 8 | Example 9 | Example 10 | Comparative Example 4 | Comparative Example 5 | Comparative Example 6 |
|---|---|---|---|---|---|---|---|---|
| Ratio of spherical titanium-based powder (mass %) | 20 | 30 | 40 | 50 | 60 | 0 | 100 | 70 |
| Ratio of non-spherical titanium-based powder (mass %) | 80 | 70 | 60 | 50 | 40 | 100 | 0 | 30 |
| Number ratio of spherical titanium-base particles (%) | 35 | 39 | 43 | 47 | 49 | 28 | 58 | 51 |
| Number ratio of non-spherical titanium-base particles (%) | 65 | 61 | 57 | 53 | 51 | 72 | 42 | 49 |
| Average circularity of mixed powder | 0.819 | 0.825 | 0.830 | 0.833 | 0.841 | 0.810 | 0.850 | 0.840 |
| CV value of particle size of mixed powder | 30 | 29 | 27 | 28 | 30 | 31 | 33 | 31 |
| Angle of repose (degrees) | 35 | 35 | 35 | 33 | 30 | 40 | 23 | 28 |
| Fluidity (s/50 g) | 35.8 | 35.0 | 34.2 | 34.9 | 35.3 | Unmeasurable | 35.6 | 35.6 |
| Shape retention property | ○ | ○ | ○ | ○ | ○ | Implementation failure | x | x |
| Apparent density (bulk density) (g/cm$^3$) | 1.85 | 2.00 | 2.08 | 2.16 | 2.20 | 1.76 | 2.50 | 2.30 |
| Tap density (g/cm$^3$) | 2.22 | 2.33 | 2.39 | 2.50 | 2.55 | 2.10 | 2.70 | 2.55 |

Example 11

A titanium ingot was produced using the titanium-based powder of Example 2 as a material and using a 3D-printer (A2 of powder bed fusion type, manufactured by Arcam). As a result, an ingot having an intended shape can be produced.

Comparative Example 7

An ingot was produced under the same conditions as in Example 11 except that the titanium-based powder of Comparative Example 3 was used as a material. In this case, a problem that the material titanium-based powder was collapsed before the titanium-based powder was molten or the like problem arose, and an ingot having an intended shape could not be produced.

INDUSTRIAL AVAILABILITY

Since the titanium-based powder of the present invention is excellent in fluidity and shape retention property, it is possible to produce an ingot and a sintered article having an intended shape.

Furthermore, the titanium-based powder regarding the present invention can be suitably used as a material powder for powder metallurgy, and among others, as a material powder for an additive manufacturing apparatus, particularly as a material powder for a 3D-printer.

The invention claimed is:
1. A titanium-based powder, which has an average circularity of 0.815 or more and less than 0.870, a coefficient of variation of particle sizes of 22 or more and 30 or less, and an angle of repose of 29 degrees or more and 36 degrees or less,
  wherein the titanium-based powder contains a spherical titanium-based powder and a non-spherical titanium-based powder,
  wherein the average circularity of primary particles of the spherical titanium-based powder is 0.85 or more and 1.0 or less, and
  wherein the average circularity of primary particles of the non-spherical titanium-based powder is 0.50 or more and less than 0.85.
2. The titanium-based powder according to claim 1, wherein the average circularity of primary particles of the non-spherical titanium-based powder is 0.50 or more and 0.81 or less.
3. The titanium-based powder according to claim 1, which contains spherical titanium-based particles in a number ratio of 35% to 80%, and contains non-spherical titanium-based particles in a number ratio of 20% to 65%.

4. The titanium-based powder according to claim 1, which is the titanium-based powder obtained by mixing the spherical titanium-based powder and the non-spherical titanium-based powder.

5. The titanium-based powder according to claim 4, wherein the spherical titanium-based powder is a titanium-based powder produced by an atomization method, a titanium-based powder produced by a plasma rotating electrode method, a titanium-based powder obtained by subjecting a titanium-based powder produced by a hydrodehydrogenation method to a plasma processing, a titanium-based powder obtained by subjecting a titanium-based powder produced by a pulverization method to a plasma processing, or a titanium-based powder obtained by mixing two or more thereof.

6. The titanium-based powder according to claim 4, wherein the non-spherical titanium-based powder is a titanium-based powder produced by a hydrodehydrogenation method, a titanium-based powder produced by a pulverization method, or a titanium-based powder obtained by mixing the foregoing powders.

7. A method of manufacturing an ingot comprising:
preparing a powder containing the titanium-based powder according to claim 1, and
melting the prepared powder.

8. A method of manufacturing a sintered article comprising:
preparing a powder containing the titanium-based powder according to claim 1, and
sintering the prepared powder.

* * * * *